United States Patent [19]

Tsai et al.

[11] 4,163,084

[45] Jul. 31, 1979

[54] ELECTROCHEMICALLY STABLE CATHODE

[75] Inventors: Keh-Chi Tsai, Saratoga; Ernest L. Littauer, Los Altos Hills, both of Calif.

[73] Assignee: Lockheed Missiles & Space Company, Inc., Sunnyvale, Calif.

[21] Appl. No.: 928,544

[22] Filed: Jul. 27, 1978

[51] Int. Cl.² ............................................ H01M 6/04
[52] U.S. Cl. ...................................... 429/206; 429/40; 429/46
[58] Field of Search ................. 429/206, 207, 209, 40, 429/44, 46, 27, 101, 29; 204/290 R

[56] References Cited

U.S. PATENT DOCUMENTS

| | | |
|---|---|---|
| 3,475,224 | 10/1969 | Adlhart et al. ................... 429/40 X |
| 4,001,043 | 1/1977 | Momyer .............................. 429/206 |
| 4,007,057 | 2/1977 | Littauer et al. ................. 429/101 X |

*Primary Examiner*—Anthony Skapars
*Attorney, Agent, or Firm*—Richard H. Bryer

[57] ABSTRACT

In an electrochemical cell, a cathode having an essentially continuous layer of ruthenium on its surface which improves the performance of the cathode during the electrochemical reduction of chlorine, oxygen or peroxyl ions in an aqueous salt electrolyte.

5 Claims, 2 Drawing Figures

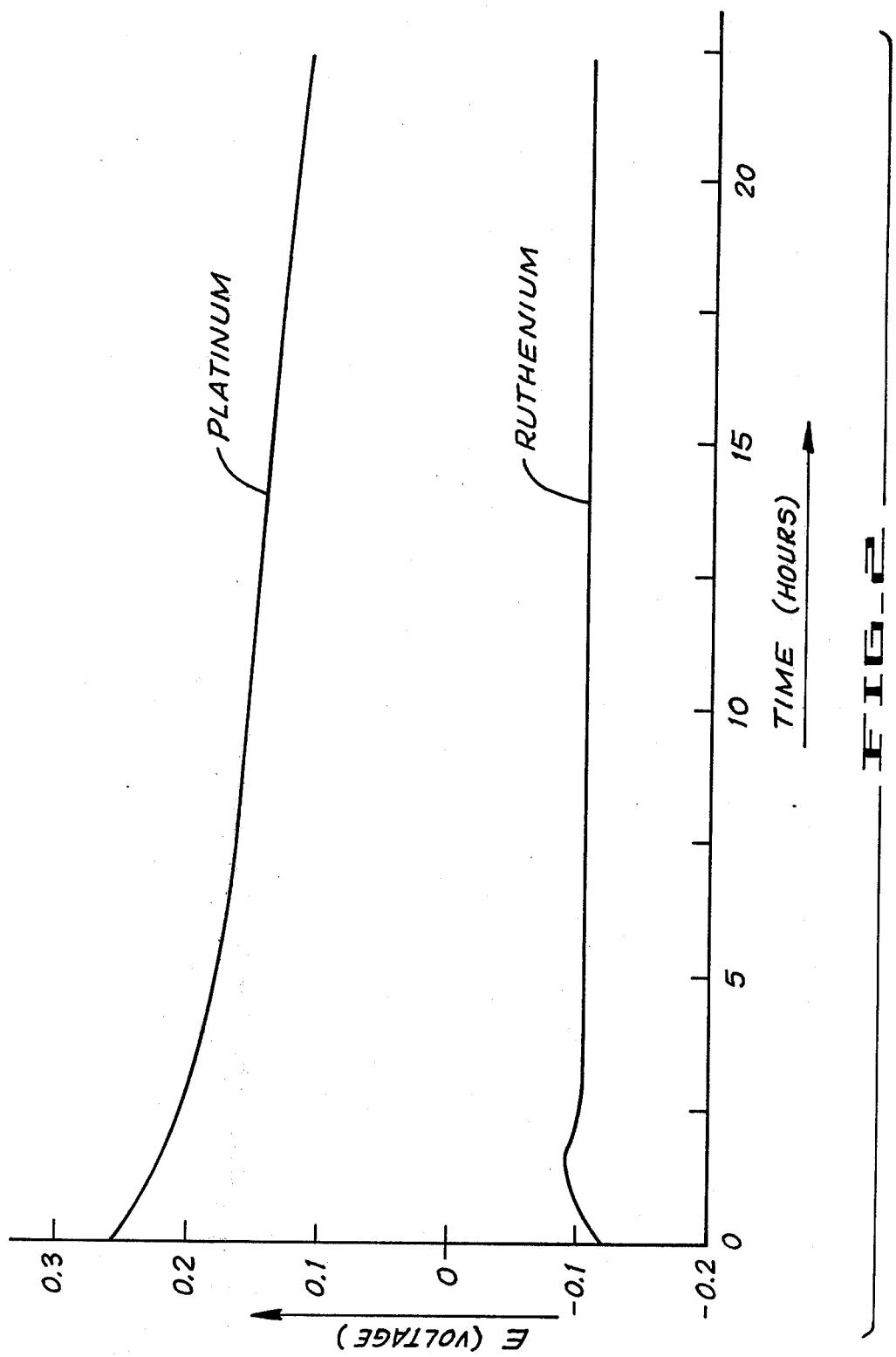

ELECTROCHEMICALLY STABLE CATHODE

BACKGROUND OF THE INVENTION

In aqueous electrochemical systems such as batteries, fuel cells, and reactors for production of chemical products there exists a need to provide a cathode which will optimize reduction of peroxyl ions or dissolved chlorine or oxygen at the cathode. Examples are those batteries or fuel cells in which the cathode reaction is the electrochemical reduction of chlorine or peroxyl ions and also air depolarized chlorine electrolysis cells in which reduction of oxygen from air occurs at the cathode while chlorine is evolved at the anode.

It is a general rule that the cathode electrode should be chemically and electrochemically inert; that is, it should not corrode to any significant extent and, at the same time, it should permit the electrochemical reduction reaction to occur with the lowest possible driving potential. In alkaline solution, a typical reduction may be that of peroxyl ions. This reduction should occur at high rates at an electrode potential as close as possible to that which is observed when the rate is very low; in other words, little polarization should be manifested. For this description, low rates are about 0–10 mA/cm$^2$ of electrode surface and high rates are greater than 100 mA/cm$^2$. Heretofore, preferred state-of-the-art electrode materials for this type of operation have been colloidal black platinum electrodeposits and palladium electrodeposits on an inert substrate. It is generally found, however, that when dealing with peroxyl ion and chlorine and oxygen reductions their electrochemical behavior is unpredictable. In clean electrolyte they show very little polarization at high rates but they are easily "poisoned" by impurities in the solution. The poisoning is manifested by an increase in polarization especially at high rates. The polarization may be as great as one to two volts but it is more frequently of the order of 0.1–0.2 volts. Typical poisons which inhibit the electrochemical reaction are chloride ions, sulfides, cyanide, mercury, and certain organic compounds such as amines. This topic is discussed with particular emphasis on platinum cathodes in the book "Catalysis" by S. Berkman, J. C. Morell, and G. Egloff, page 398, published in 1940 by Reinhold Publishing Corp., New York, N.Y.

SUMMARY OF THE INVENTION

Briefly, in accordance with the invention, it has been discovered that a stable cathode for peroxyl ion, chlorine and oxygen reductions in alkaline salt solutions comprises a cathode having a surface of ruthenium metal. The cathode may be substantially ruthenium metal or a conductive substrate such as platinum or nickel having an essentially continuous layer of ruthenium on its surface. Illustrative alkaline salt solutions which support the desired reductions are the aqueous alkali metal hydroxides of lithium, sodium and potassium. Other alkaline salt solutions which will support such reductions as well as suitable anode materials that are complementary to such reductions are well known to those skilled in the art.

In one embodiment of the invention, the electrochemically reducible species is peroxyl ions which are reduced to hydroxyl ions, or water at the cathode. The peroxyl ions $HO_2^-$ are either directly reduced to hydroxyl ions or water (see, for example, U.S. Pat. No. 4,001,043) or initially reduced to oxygen which is reduced to hydroxyl ions or water. Many studies have been performed over the years to elucidate the mechanisms of peroxyl ion reduction in alkaline solutions. Electrochemical mechanisms are considered by V. S. Bagostskii and I. E. Yablokova in the Russian Journal of Physical Chemistry (Zh. Fiz. Khim.) 1953, Volume 27, page 1663. Chemical mechanisms are discussed by F. Haber and S. Grinberg in the German publication, Journal of Inorganic and General Chemistry (Zeit. Anorg. Allgm. Chem.) 1938, Volume 18, page 37. For the purposes of the invention, the particular mechanism by which peroxyl ions are reduced at the cathode is not material. The peroxyl ions in the electrolyte are formed from soluble peroxide compounds such as hydrogen peroxide, sodium peroxide, sodium super oxide, lithium peroxide, potassium peroxide, potassium super oxide and the like.

In another embodiment of the invention where oxygen is to be electrochemically reduced to hydroxyl ions or water, the oxygen may be introduced using a porous gas electrode of the type developed for oxygen/hydrogen fuel cells and the like. Here, ruthenium is substituted for the platinum or silver catalyst in the porous gas electrodes typically utilized by the art and described, for example, in "Fuel Cells—Modern Process for the Electrochemical Production of Energy," Wolf Vielstich, English Ed., 1970, Wiley Interscience.

In still another embodiment of the invention, the electrochemically reducible species is dissolved chlorine which is reduced to chloride ions at the cathode. Sodium hypochlorite dissolved in the electrolyte is a typical source of chlorine. Here, the chlorine appears as $ClO^-$ ions which are reduced to chloride ions; see U.S. Pat. No. 4,007,057.

The use of a ruthenium cathode to effect such reductions is unexpected because information in the literature specifies that ruthenium is an unsuitable material for use in alkaline solutions. In his book, "Atlas D'Equilibre Electrochimiques" published in 1963 by Gauthier-Villars and Co., Paris, M. Pourbaix states "ruthenium is easily corroded by oxidizing alkaline solutions such as peroxides or alkaline hypochlorites." In a paper by P. Eichmer entitled, "Voltamperometric Study of Ruthenium in Aqueous Solution," which appeared in the Bulletin of the Chemical Society of France (Bull. Soc. Chim. France), 1967, No. 6, pages 2051–2055, the apparent instability of the subject metal in alkaline solutions containing oxygen and the hydrogen peroxide decomposition product—the peroxyl ion—is discussed. It is believed that a possible cause for the beneficial behavior of ruthenium may be associated with a very slow chemical dissolution of the ruthenium in the solution. This dissolution amounts to only a few atom layers per unit of time and contaminants and poisons may therefore be constantly removed from the surface together with the ruthenium atoms. It has been found that the dissolution rate of ruthenium is in fact so slow that the physical dimensions and features of the cathode are not measurably changed after many hours of service and therefore long term utilization is not compromised.

Ruthenium metal has heretofore been utilized as an anode coating in alkaline solutions, see, for example, U.S. Pat. No. 2,157,511. However, this use is not analogous to use of ruthenium metal as a cathode material. The oxidation reaction at the anode causes formation of a ruthenium oxide film on the metal which is electrochemically active but protective of the underlying metal. The resulting oxide coated ruthenium metal is accordingly stable in alkaline solutions. To the contra, however, the dissimilar cathode reaction precludes formation of a protective oxide film and, accordingly, one would expect, in view of the previously discussed articles by Pourbaix and Eichner, that the instability of ruthenium in alkaline solutions would preclude its use as a cathode material. Furthermore, there is no way to predict from the anodic inertness of an anode what materials would be insensitive to cathodic poisoning at the cathode.

BRIEF DESCRIPTION OF THE DRAWING

The invention may be more easily understood from the following description and accompanying drawing in which:

FIG. 2, on coordinates of voltage and time in hours, is a plot depicting illustrative polarization of sodium hypochlorite at palladium and and ruthenium surfaces immersed in sodium hydroxide.

DESCRIPTION OF THE PREFERRED EMBODIMENTS

Figure 1:
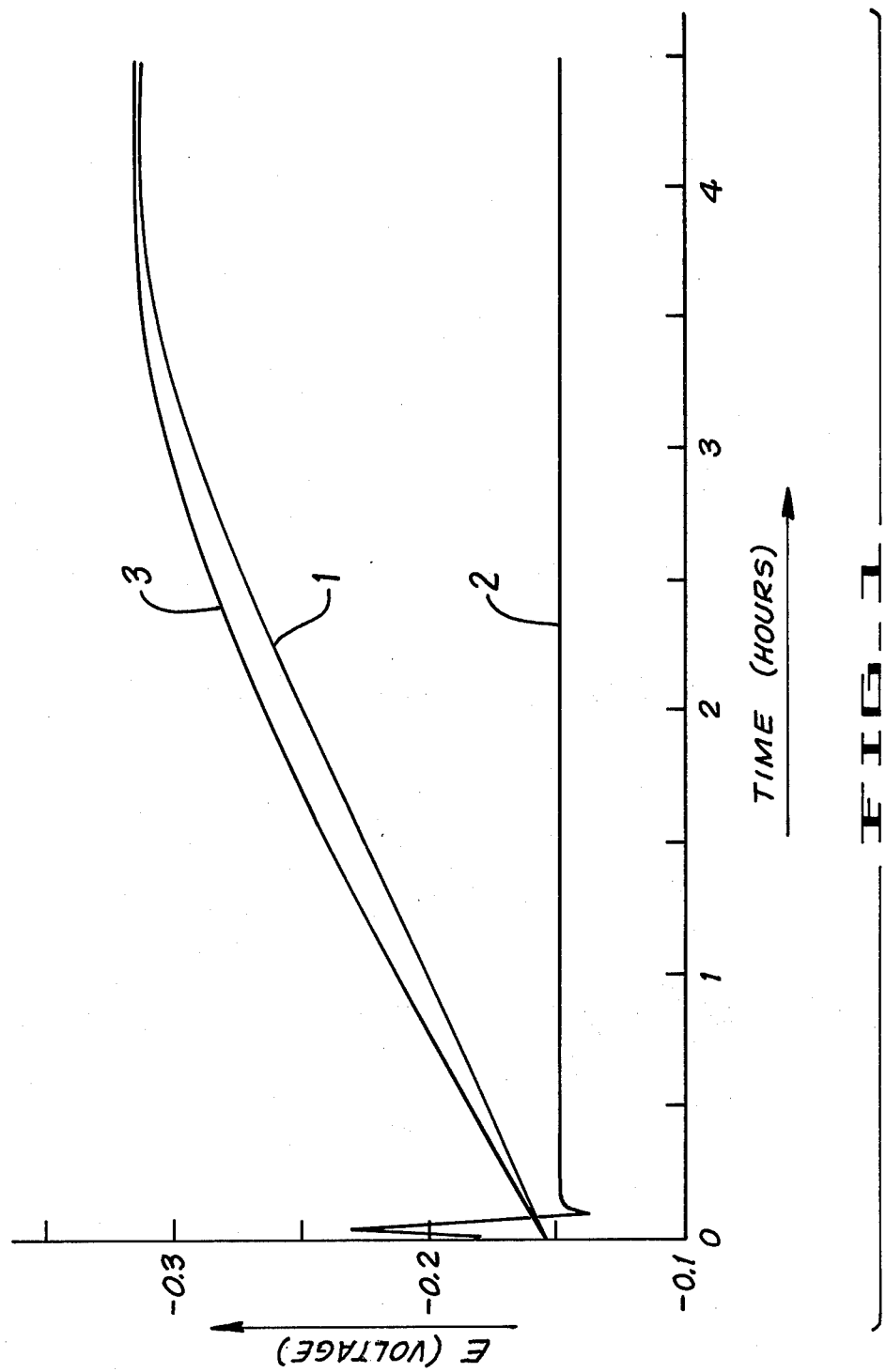
FIG. 1, on coordinates of voltage and time in hours, is a plot depicting illustrative polarization of hydrogen peroxide at palladium and ruthenium surfaces immersed in a lithium hydroxide electrolyte.

The test results depicted in FIG. 1 and FIG. 2 were obtained using a test cell of teflon construction. The cell had a reference probe equipped with a mercury/mercury oxide electrode. A rotating disc electrode, 0.46 $cm^2$ in area, was utilized as the cathode in the cell. The rotating disc electrode was driven by a Pine Instruments Model ASR2 analytical rotator. A Princeton Applied Research Model 173 potentiostat/galvanostat and a Princeton Applied Research Model 75 Universal Programmer coupled with a Varian Model F-100 X-Y recorder completed the instrumentation. The anode of the cell was a platinum gauze of high surface area, approximately fifty times the area of the anode. The test cell contained approximately 500 ml of electrolyte. The ruthenium cathode was prepared by plating ruthenium onto a platinum disc. However, other techniques known to the art such as vapor deposition are equally feasible to form the ruthenium surface. The palladium cathode was prepared by electrodepositing palladium metal onto a platinum substrate using a commercially available palladium plating solution.

Referring more particularly to FIG. 1, there is depicted a comparison of the polarization of hydrogen peroxide occuring at a palladium and a ruthenium cathode. At a current density of 160 mA/$cm^2$ of electrode area, the palladium electrode was operated as a cathode in a solution containing 4 moles of lithium hydroxide plus 0.6 moles of hydrogen peroxide plus 3.5 weight percent sodium chloride at 25° centigrade. As shown by curve 1, at the beginning of the test the electrode showed a potential of about $-0.15V$ when compared to a mercury/mercury oxide reference electrode. After two hours, the potential had degraded to $-0.25V$ and after four hours it had reached a steady state potential of $-0.32V$. A bright ruthenium electrode was prepared by electrodeposition of ruthenium onto a platinum substrate. Many ruthenium plating solutions exist; the one described by C. D. Burke and T. O. O'Meara in the 1971 edition, page 839, of the Journal of the Chemical Society of London was used for this test. It comprised 10 grams of ruthenium trichloride hydrate ($RuCl_3 \cdot nH_2O$) dissolved in 1 liter of 0.1 normal solution of hydrochloric acid. The plating current density was 4 mA/$cm^2$. This electrode was tested in the same solution and under identical conditions as the palladium. As shown by curve 2, after some instability for the first few minutes of test, the electrode took on a potential of $-0.15V$ vs the mercury/mercury oxide reference and the potential, thereafter, remained constant at $-0.15V$. A subsequent test was performed on palladium in artificial sea water made up from 3-5 weight percent sodium chloride plus trace elements known to exist in sea water plus hydrogen peroxide. As shown by curve 3, the palladium's behavior was identical in this solution as it was in solution free of trace elements. The ruthenium electrode was tested identically in solution containing the trace elements and, as before, it showed identical stable performance.

Referring more particularly to FIG. 2, there is depicted a comparison of the polarization of sodium hypochlorite occuring at a platinum and a ruthenium cathode. The same test conditions described in FIG. 1 were utilized with the exception that the current density was 50 mA/$cm^2$ and the electrolyte was 4.3 M sodium hydroxide containing 0.72 moles of sodium hypochlorite. In common with the test results of FIG. 1, the ruthenium cathode when operated under these conditions showed stable performance while the platinum cathode was unstable.

What is claimed is:

1. An electrochemical cell consisting essentially of an anode, a cathode having an essentially continuous layer of ruthenium on its surface and an aqueous alkaline salt electrolyte in which said anode and cathode are immersed, said electrolyte containing a reducible species selected from the group consisting of peroxyl ions, chlorine and oxygen which is electrochemically reduced at said cathode.

2. An electrochemical cell in accordance with claim 1 wherein said electrolyte in an alkali metal hydroxide.

3. An electrochemical cell in accordance with claim 2 wherein said electrolyte contains peroxyl ions.

4. An electrochemical cell in accordance with claim 2 wherein said electrolyte contains chlorine.

5. An electrochemical cell in accordance with claim 2 wherein said electrolyte contains oxygen.

* * * * *